US012681560B2

(12) United States Patent
Jain et al.

(10) Patent No.: US 12,681,560 B2
(45) Date of Patent: Jul. 14, 2026

(54) METHOD AND APPARATUS FOR MANAGING A VIRTUAL SESSION

(71) Applicant: SAMSUNG ELECTRONICS CO., LTD., Suwon-si (KR)

(72) Inventors: Ankit Jain, Bangalore (IN); Siba Prasad Samal, Bangalore (IN); Mukunth A, Bangalore (IN); Suyambulingam Rathinasamy Muthupandi, Bangalore (IN); Kishore Chandra Sahoo, Bangalore (IN); Jay Sharma, Bangalore (IN); Chiranjeevi A R Hegde, Bangalore (IN); Mridul Gupta, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 165 days.

(21) Appl. No.: 18/213,007

(22) Filed: Jun. 22, 2023

(65) Prior Publication Data

US 2024/0012468 A1      Jan. 11, 2024

Related U.S. Application Data

(63) Continuation of application No. PCT/KR2023/007436, filed on May 31, 2023.

(30) Foreign Application Priority Data

Jul. 6, 2022      (IN) .............................. 202241038802
Feb. 20, 2023      (IN) .............................. 202241038802

(51) Int. Cl.
*G06F 3/01*      (2006.01)
*G06T 19/00*      (2011.01)

(52) U.S. Cl.
CPC ............ *G06F 3/011* (2013.01); *G06T 19/006* (2013.01)

(58) Field of Classification Search
None
See application file for complete search history.

(56) References Cited

U.S. PATENT DOCUMENTS 8,260,728 B1      9/2012  Walsh et al.
10,300,371 B2      5/2019  Ghaffari et al.
(Continued)

FOREIGN PATENT DOCUMENTS

WO      2018/102122 A1      6/2018
WO      2018165446 A1      9/2018
WO      2021/185600 A1      9/2021

OTHER PUBLICATIONS

International Search Report and Written Opinion (PCT/ISA/210, and PCT/ISA/237) dated Sep. 1, 2023, issued by International Searching Authority in International Application No. PCT/KR2023/007436.

(Continued)

*Primary Examiner* — Hilina K Demeter
(74) *Attorney, Agent, or Firm* — Sughrue Mion, PLLC

(57) ABSTRACT

The present disclosure provides methods, apparatuses, and systems for managing a virtual session. In some embodiments, the method includes identifying a current activity performed by a user in the virtual session, determining at least one first parameter of the virtual session associated with the current activity, detecting an occurrence of at least one event in a real-world environment, determining a correlation between the at least one event and the at least one first parameter, determining at least one second parameter to be associated with the current activity, based on the correlation, and transforming the virtual session by modifying the (Continued)

at least one first parameter based on the at least one second parameter.

18 Claims, 16 Drawing Sheets

(56)                    References Cited

U.S. PATENT DOCUMENTS

| 10,831,266 | B2 | 11/2020 | Murali et al. |
| 10,946,280 | B2 * | 3/2021 | Kunieda ................. A63F 13/65 |
| 2012/0302289 | A1 | 11/2012 | Kang |
| 2015/0040036 | A1 | 2/2015 | Crocker et al. |
| 2016/0335801 | A1 * | 11/2016 | Yoon ................... G06F 3/04842 |
| 2018/0232056 | A1 | 8/2018 | Nigam et al. |
| 2018/0276891 | A1 | 9/2018 | Craner |
| 2019/0035124 | A1 * | 1/2019 | Kapinos .................. G06T 11/60 |
| 2019/0108578 | A1 * | 4/2019 | Spivack ................. G09B 5/065 |
| 2019/0138085 | A1 * | 5/2019 | Eronen ................. G06F 3/0482 |
| 2019/0289419 | A1 | 9/2019 | Eronen et al. |
| 2020/0027257 | A1 * | 1/2020 | Arana ..................... G06T 11/60 |
| 2020/0171384 | A1 | 6/2020 | Goslin et al. |
| 2020/0211506 | A1 | 7/2020 | Zavesky et al. |
| 2022/0044021 | A1 | 2/2022 | Powderly et al. |

OTHER PUBLICATIONS

Communication issued May 7, 2025 by Intellectual Property India in Indian Patent Application No. 202241038802.
Communication dated May 30, 2025, issued by the European Patent Office in European Application No. 23835695.0.
Communication dated Apr. 9, 2026, issued by the Indian Patent Office in Indian Patent Application No. 202241038802.

* cited by examiner

| Parameters of Current Activity | Value |
|---|---|
| Number of Avatar Displayed | All |
| Audio of Virtual Session | Mid volume |
| Avatar Focus | Disabled |
| Subtitles | Disabled |

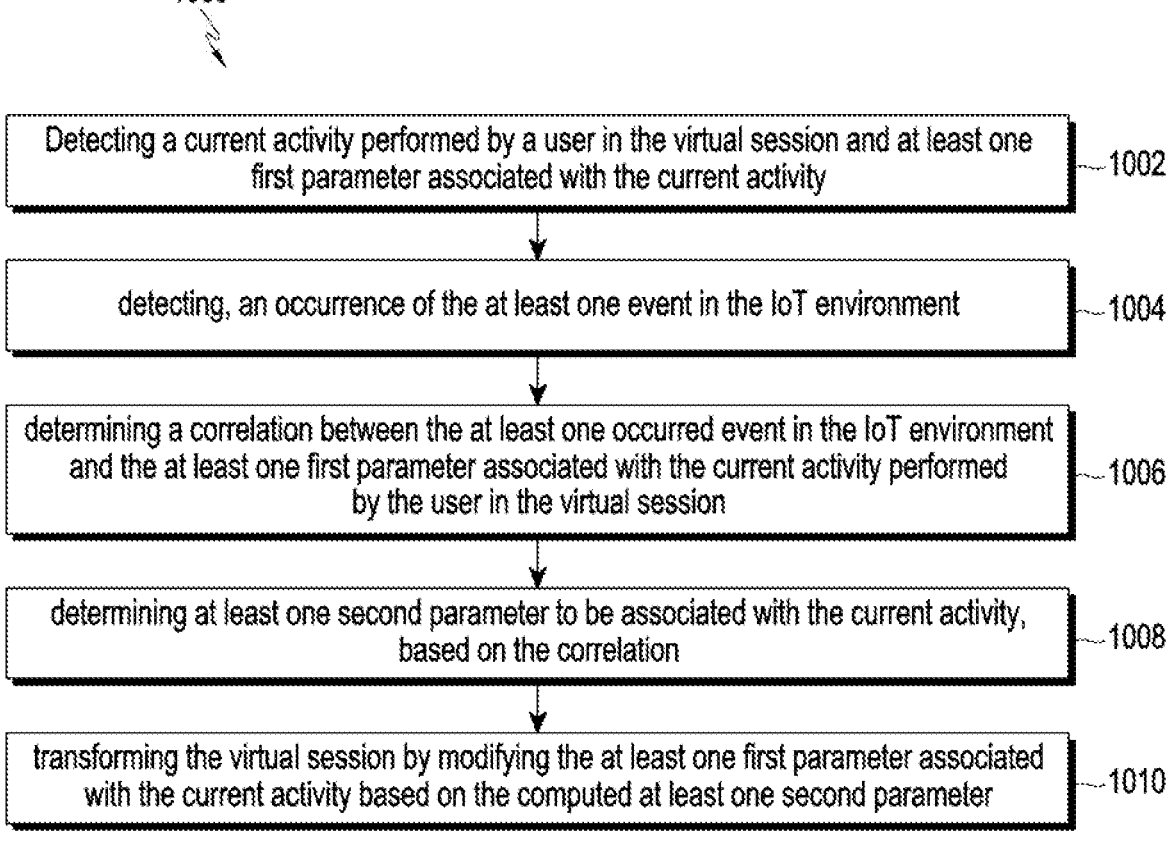

1000

Detecting a current activity performed by a user in the virtual session and at least one
first parameter associated with the current activity                                          —1002 detecting, an occurrence of the at least one event in the IoT environment                      —1004 determining a correlation between the at least one occurred event in the IoT environment
and the at least one first parameter associated with the current activity performed
by the user in the virtual session                                                             —1006 determining at least one second parameter to be associated with the current activity,
based on the correlation                                                                       —1008 transforming the virtual session by modifying the at least one first parameter associated
with the current activity based on the computed at least one second parameter                  —1010

FIG.10

METHOD AND APPARATUS FOR MANAGING A VIRTUAL SESSION

CROSS-REFERENCE TO RELATED APPLICATIONS

This application is a continuation of International Application No. PCT/KR2023/007436 designating the United States, filed on May 31, 2023, in the Korean Intellectual Property Receiving Office and claiming priority to Indian Provisional Patent Application No. 202241038802, filed on Jul. 6, 2022, in the Indian Patent Office, and Indian Complete Patent Application No. 202241038802, filed on Feb. 20, 2023, in the Indian Patent Office, the disclosures of which are incorporated by reference herein in their entireties.

FIELD OF THE INVENTION

The disclosure relates generally to virtual environments, and more particularly, to methods and apparatuses for managing a virtual session based on external events.

BACKGROUND

Users have started to replicate their real-world lives in virtual environments in different domains such as, but not limited to, office workspaces, shopping complexes, and the like. The virtual environments may create simulated environments which the user may inhabit. For example, the virtual environment, which may also be referred to as virtual reality, may place the user inside a three-dimensional (3 D) experience. That is, instead of viewing a two-dimensional (2 D) screen located in front of the user, the user may be immersed inside of and/or may interact with 3 D worlds created by the virtual environments.

For instance, a metaverse may refer to a form of a virtual environment in which the user may create a virtual avatar to interact with the metaverse and/or to create an online presence that may integrate virtual places and/or environments. A related metaverse may provide an integrated network of 3 D virtual worlds. These virtual worlds may be accessed through one or more virtual reality devices, such as, but not limited to, a head-mounted display unit and/or headset, a 3 D mouse, an optical tracker, a wired glove (e.g., a haptic glove), and an omnidirectional treadmill. The user may navigate the related metaverse using at least one of their eye movements, feedback controllers, and voice commands. For example, the headset may immerse the user in the virtual worlds by stimulating in the user a sensation that may be referred to as presence, which may be created by generating the physical sensation of actually being in the virtual environment.

An immersed user, (e.g., immersed in a metaverse session) may remain unaware about the user's actual physical surroundings such as, but not limited to, events occurring in real-world. Consequently, the user may be hampered from responding to real-world events such as, but not limited to, an event occurring on at least one of multiple electronic devices in the real-world, and the like.

For example, if an immersed user wishes to interact with the user's physical surrounding environment in the real-world, then the immersed user may need to drop (e.g., pause) their current tasks in the metaverse and/or end the current metaverse session in order to interact with real-world. Alternatively or additionally, if an event occurs in real-world, which may be detected through an Internet of Things (IoT)

device, an inconvenience to the immersed user may not be avoided by modifying the metaverse session with respect to the event that occurred in the real-world. That is, related techniques may only provide notification related to the real-world event to the immersed user in the metaverse session, which may not be sufficient and/or may fail to appropriately disrupt the user immersion in the metaverse session.

The related art techniques may be limited to gathering user related events (e.g., emotional state, physical movements) and reflecting the events in the metaverse session. For example, a status of a IoT device in the metaverse session may be updated by replicating the physical properties of the IoT device in the metaverse session. Other related techniques may display a current real-world status in the metaverse session in front (e.g., within a front field of view) of the user. However, showing status may distract and/or disrupt the immersion of the user in the metaverse session. Thus, potentially imparting a significant cognitive load on the user and/or leading to a poor experience of the virtual world as the metaverse session may be stopped to momentarily show the real-world.

Therefore, when the user is in a metaverse session, the user may be immersed in the metaverse session but for the occurrence of real-world events (e.g., IoT device events) that may require the user's attention and/or focus. Consequently, the user may experience an inconvenience in the metaverse session as the user may be compelled to cater to the events in the real-world.

The related art techniques may fail to provide a natural synchronization between the metaverse session and the real-world events, by requiring the user to switch between pause and play of the metaverse session to switch between the metaverse session and the real-world. As such, the metaverse session may not represent a real-time situation of the user corresponding to the real-world and may be limited to provide an immersive experience to the user.

To that end, natural switching and/or seamless switching between the metaverse session and the user's reality in the real-world may be desirable. That is, it may be desirable for the user not to lose the immersion in the metaverse session and still be able to perform an intended task in the metaverse session without getting impacted from the real-world event. For example, it may be desirable for the metaverse session to transform according to the real-world event so that the user may not be inconvenienced from completing the intended task in the metaverse session and cater to the real-world event.

There exists a need for further improvements in virtual environments, as the need for immersive virtual environments may be constrained by a lack of synchronization between the user's real life and the metaverse session.

SUMMARY

This summary is provided to introduce a selection of concepts, in a simplified format, that are further described in the detailed description of the disclosure. This summary is neither intended to identify key or essential inventive concepts of the disclosure and nor is it intended for determining the scope of the disclosure.

According to an aspect of the disclosure, a method for managing a virtual session is provided. The method includes identifying a current activity performed by a user in the virtual session, determining at least one first parameter of the virtual session associated with the current activity, detecting an occurrence of at least one event in a real-world environment, determining a correlation between the at least one event and the at least one first parameter, determining at least one second parameter to be associated with the current activity, based on the correlation between the at least one event and the at least one first parameter, and transforming the virtual session by modifying the at least one first parameter based on the at least one second parameter.

According to an aspect of the disclosure, an apparatus for transforming a virtual session is provided. The apparatus includes a memory and a processor communicatively coupled to the memory. The processor is configured to identify a current activity performed by a user in the virtual session, determine at least one first parameter of the virtual session associated with the current activity, detect an occurrence of at least one event in a real-world environment, determine a correlation between the at least one event and the at least one first parameter, determine at least one second parameter to be associated with the current activity, based on the correlation between the at least one event and the at least one first parameter, and transform the virtual session by modifying the at least one first parameter based on the at least one second parameter.

According to an aspect of the present disclosure, a system for transforming a virtual session is provided. The system includes a controller configured to detect a current activity performed by a user in the virtual session, select at least one first parameter of the virtual session associated with the current activity, detect an occurrence of at least one event in a real-world environment, determine a correlation between the at least one event and the at least one first parameter, compute at least one second parameter to be associated with the current activity, based on the correlation, and transform the virtual session by modifying the at least one first parameter based on the at least one second parameter.

According to an aspect of the disclosure, a method for enhancing an experience of a user immersed in a virtual session is provided. The method includes recognizing at least one event occurrence in a real-world environment in vicinity of the user while the user is immersed in the virtual session. The method further includes analyzing at least one entity of the virtual session currently being accessed the user with reference to the at least one event occurrence. The method further includes creating a change in the at least one entity of the virtual session such that at least one effect caused on the user due to the at least one event occurrence is controlled.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 illustrates a flowchart depicting an exemplary method for transforming a virtual session based on an event in a real-world environment, according to an embodiment of the present disclosure.

DETAILED DESCRIPTION

Figure 1:
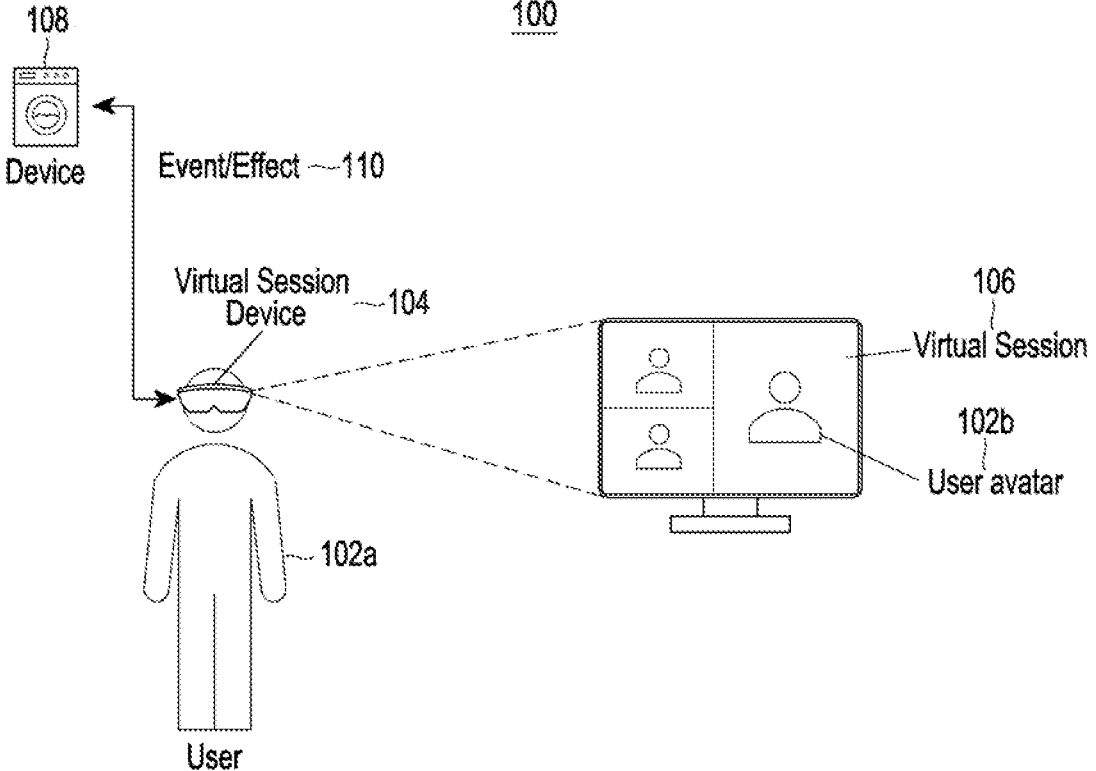
FIG. 1 illustrates a block diagram depicting an environment of a system for transforming a virtual session based on an event in a real-world environment, according to an embodiment of the present disclosure.

For the purpose of promoting an understanding of the principles of the present disclosure, reference is made to the various embodiments and the language used to describe the same. It is to be understood that no limitation of the scope of the present disclosure is thereby intended, such alterations and/or further modifications in the illustrated system, and/or such further applications of the principles of the present disclosure as illustrated therein being contemplated as would normally occur to one skilled in the art to which the present disclosure relates.

It is to be understood by those skilled in the art that the foregoing general description and the following detailed description are explanatory of the present disclosure and are not intended to be restrictive thereof.

Further, skilled artisans may appreciate that elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The present disclosure is generally directed towards a method, an apparatus, and a system for transforming a virtual session based on occurrence of an event in a real-world which may include an Internet of Things (IoT) environment. For example, while a user is immersed in the virtual session, the event occurred may cause an inconvenient effect on a current activity of the user in the virtual session. Thus, the present disclosure may transform the virtual session such that the user continues to perform the current activity without the inconvenient effect and/or with a reduced inconvenience.

Figure 2:
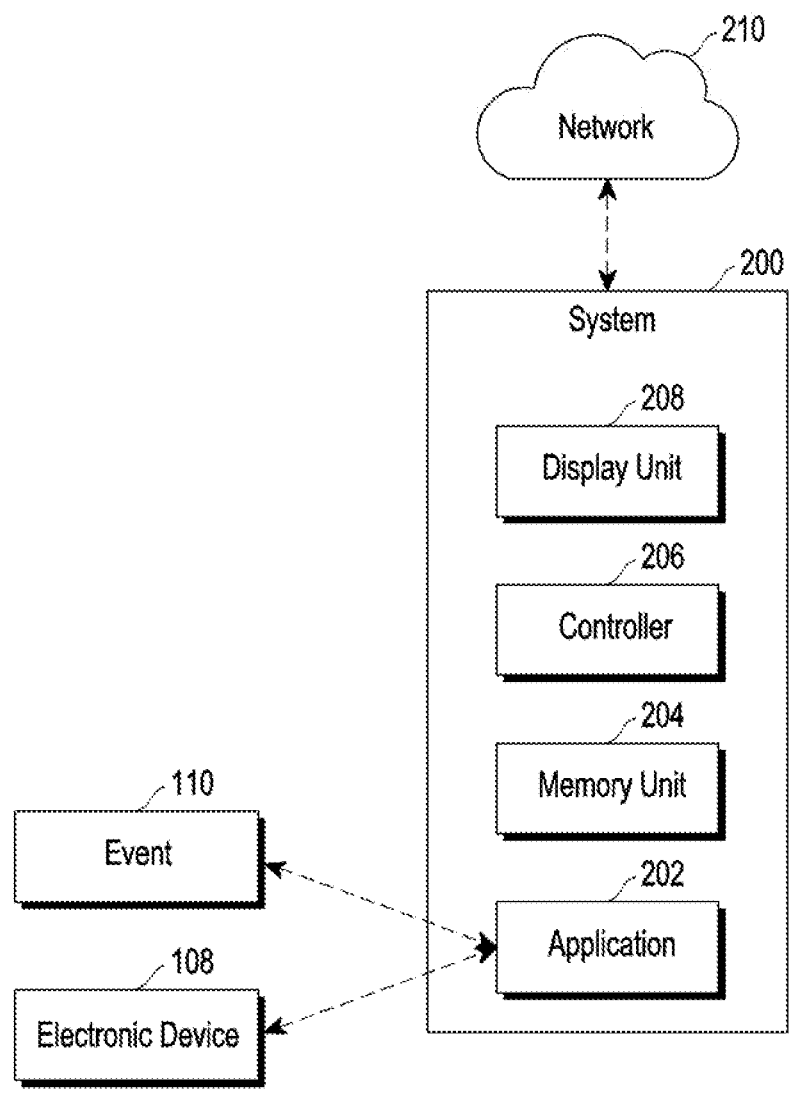
FIG. 2 illustrates a block diagram of the system, according to an embodiment of the present disclosure.

FIG. 1 illustrates a block diagram depicting a real-world environment 100 of a system for transforming the virtual session based on an event in the real-world environment 100, according to an embodiment of the present disclosure. FIG. 2 illustrates a block diagram of the system 200 for transforming the virtual session based on an event in the real-world environment 100, according to an embodiment of the present disclosure. For the sake of brevity, the system 200 for transforming the virtual session based on an event in the real-world environment 100 is hereinafter interchangeably referred to as the system 200.

Referring to FIGS. 1 and 2, the system 200 may be implemented between a user 102a wearing a virtual session device 104 and an electronic device 108 in the real-world environment 100. The virtual session device 104 may be configured to display a virtual session 106 over the field of view of the user 102a.

In an embodiment, the electronic device 108 may be provided in the real-world environment 100 such as, but not limited to, a residential premise or a commercial premise. The electronic device 108 may be referred to as smart device and may include, but not be limited to, a refrigerator, an air conditioner, a microwave, a television, a smartwatch, a wearable device, a voice-controlled virtual assistant, an IoT device, and the like. The electronic device 108 may be capable of interacting with the user 102a and/or the virtual session device 104. For example, the electronic device 108 may trigger an occurrence of an event and/or may detect that an event occurred in the real-world environment 100.

The system 200 may include the virtual session device 104. The virtual session device 104 may include, for example, a head-mounted display (HMD) configured to display images of both the physical world and/or virtual objects over the user's field of view. For example, the user 102a may wear the virtual session device 104 on the forehead to immerse in the virtual session 106, such as, but not limited to, a metaverse session. In an embodiment, the virtual session device 104 may include, but not be limited to, a tablet personal computer (PC), a personal digital assistant (PDA), a mobile device, a palmtop computer, a laptop computer, a desktop computer, a server, a cloud server, a remote server, a communications device, an HMD, or any other device controllable through a network (e.g., wired or wireless) and/or capable of executing a set of instructions (sequential or otherwise) that specify actions to be taken by that device.

In an embodiment, the system 200 may be connected to a network 210 such as, but not limited to, a cloud or an edge network, for storing information relating to the virtual session.

The system 200 may include an application 202 configured to be installed in the virtual session device 104. In an embodiment, the application 202 may be communicatively coupled to the electronic device 108. In an optional or additional embodiment, the system 200 may receive user input through the application 202. The application may be further configured to render the immersive experience of the virtual session 106 for the user 102a on a display unit 208 of the system 200. The display unit 208 may be an integrated part of the virtual session device 104 providing an immersive experience of the virtual session 106 to the user 102a. For example, while the user 102a is immersed in the virtual session 106, the user 102a may perform a current activity in the virtual session 106.

The system 200 may include a memory unit 204 configured to store data relating to the operation of the system 200. For example, the memory unit 204 may be configured to save a user profile specific to the virtual session 106. In an embodiment, the memory unit 204 may include a non-transitory computer-readable medium including, but not limited to, volatile memory (e.g., static random-access memory (SRAM) and dynamic random-access memory (DRAM)), and/or non-volatile memory (e.g., read-only memory (ROM), erasable programmable ROM (EEPROM), flash memories, hard disks, optical disks, magnetic tapes, and the like).

Figure 3:
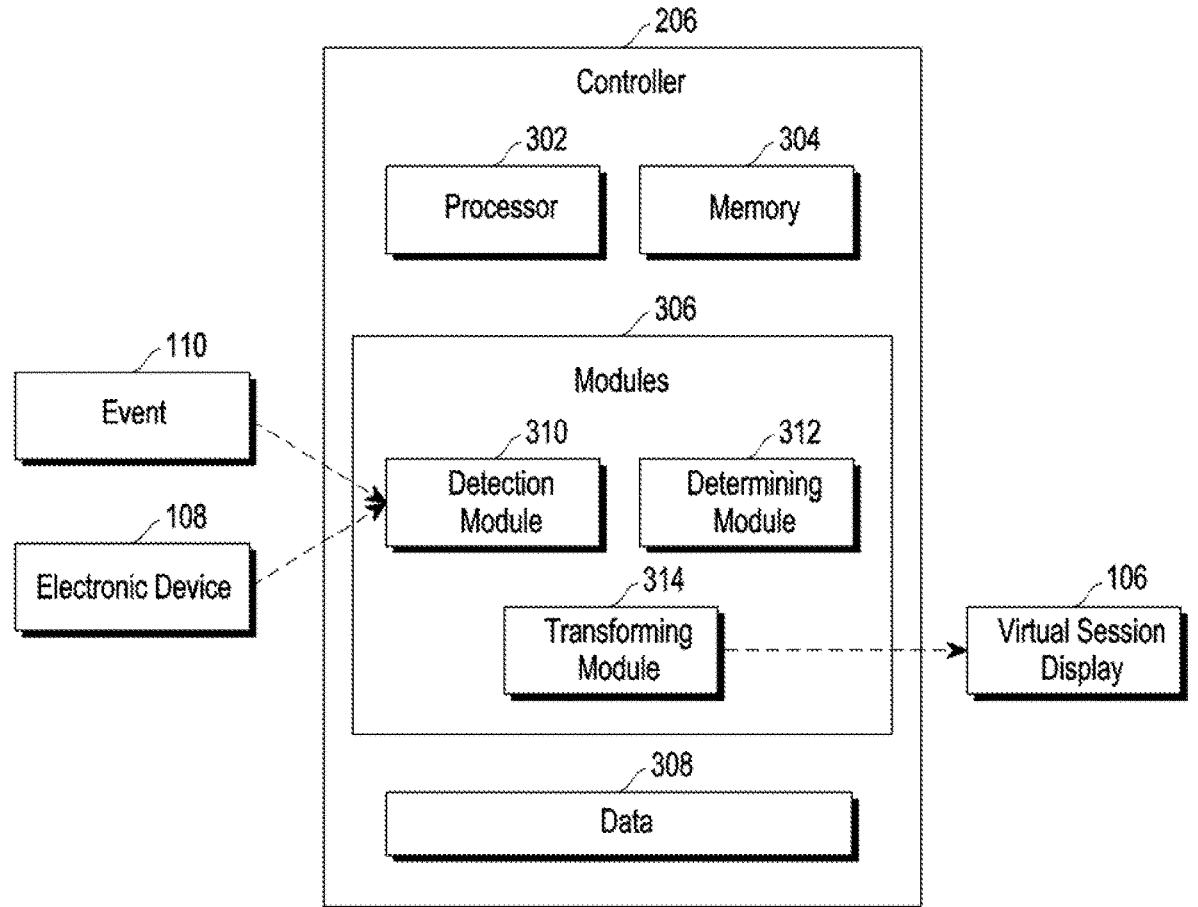
FIG. 3 illustrates a block diagram of a controller of the system, according to an embodiment of the present disclosure.

In an embodiment, the system 200 may include a controller 206 in communication with the application 202, the display unit 208, and the memory unit 204. FIG. 3 illustrates a block diagram of the controller 206, according to an embodiment of the present disclosure. The controller 206 may include, but not be limited to, a processor 302, memory 304, modules 306, and data module 308. The modules 306 and the memory 304 may be coupled to the processor 302.

In an embodiment, the processor 302 may include a single processing unit. In an optional or additional embodiment, the processor 302 may include a plurality of processing units. Alternatively or additionally, each of the processing units may include multiple computing units. The processor 302 may include one or more microprocessors, microcomputers, microcontrollers, digital signal processors (DSP), central processing units (CPU), state machines, logic circuitries, and/or any devices that may manipulate signals based on operational instructions. Among other capabilities, the processor 302 may be configured to fetch and execute computer-readable instructions and data stored in the memory 304.

The memory 304 may include a non-transitory computer-readable medium including, but not limited to, volatile memory (e.g., SRAM, DRAM), and/or non-volatile memory (e.g., ROM, EEPROM, flash memories, hard disks, optical disks, magnetic tapes, and the like).

The modules 306 may include routines, programs, objects, components, data structures, and the like, which may perform particular tasks and/or implement data types. Alternatively or additionally, the modules 306 may be implemented as, one or more signal processors, one or more state machines, logic circuitries, and/or other devices or components that may manipulate signals based on operational instructions.

In some embodiments, the modules 306 may be implemented in hardware, instructions executed by a processing unit, and/or by a combination thereof. The processing unit may comprise a computer, a processor (e.g., processor 302), a state machine, a logic array, or other suitable devices capable of processing instructions. The processing unit may include a general-purpose processor (GPU) which may execute instructions to cause the general-purpose processor to perform the required tasks or, the processing unit may be dedicated to performing the required functions. In another optional or additional embodiment, the modules 306 may include machine-readable instructions (e.g., software) which, when executed by a processor/processing unit, may perform any of the described functionalities.

In an embodiment, the modules 306 may include a detection module 310, a determining module 312, and a transforming module 314. The detection module 310, the determining module 312, and the transforming module 314, may be in communication with each other. The data module 308 may serve as a repository for storing data processed, received, and/or generated by one or more of the modules 306.

Referring to FIGS. 1 to 3, the detection module 310 may be configured to detect the current activity performed by the user 102*a* in the virtual session 106. That is, the current activity may be representative of an ongoing activity which may resemble a real-world activity but may be performed in the virtual session 106, such as a metaverse session. For example, an avatar 102*b* may be performing a current activity such as, but not limited to, shopping in a mall, playing a game, meeting with other users and/or user avatars, and the like, in the metaverse session.

In an embodiment, the detection module 310 may be configured to detect the current activity performed by the user 102*a* in the virtual session 106 based on at least one or more of, but not limited to, an audio signal, a position, a time, an avatar, and an event information associated with the virtual session 106.

In an optional or additional embodiment, the detection module 310 may be configured to determine a first parameter associated with the current activity. The first parameter may be representative of sets of conditions that the user 102*a* may perceive through the avatar 102*b* to achieve a user intent in the virtual session 106. For example, the first parameter associated with the current activity may include, but not be limited to, a speed of the avatar 102*b*, an exploratory area, a current volume of the avatar 102*b* or the virtual session 106. That is, the first parameter may be dependent and may affect the current activity such that a change in the first parameter may transform the current activity in the virtual session 106.

Alternatively or additionally, the detection module 310 may be configured to detect the user intent to perform the current activity in the virtual session 106. The user intent may be indicative of goals and/or tasks the user 102*a* may be trying to achieve in the virtual session. For example, while performing the current activity, the user 102*a* may have the user intent to buy a smartphone from the virtual electronics shop present in the virtual session 106. In such an example, the first parameter associated with the current activity may affect the user intent in the virtual session 106. That is, when the first parameter includes an exploratory area in the virtual session 106, first parameter may affect the user intent of shopping for a smartphone by affecting the time taken by the user 102*a* to complete the goal and/or tasks of shopping for the smartphone, for example.

In an embodiment, the detection module 310 may be configured to detect an occurrence of the event in the real-world environment 100. The event may be indicative of a real-world event while the user 102*a* is immersed in the virtual session 106. For example, the event may include an incoming cab notification, a doorbell ringing, a notification about body vitals by a smart watch, a microwave buzzing sound, and the like. That is, the event may generally involve a real-world occurrence which may affect the immersive experience of the user 102*a* in the virtual session 106. For example, the user 102*a* may wish to attend to the real-world event but doing so may cause inconvenience to the user 102*a* in the ongoing virtual session 106. For another example, the event may occur as a result of the electronic device 108 in the real-world environment 100. In such an example, the electronic device 108 (e.g., a washing machine) may create a notification buzzing sound which may be considered as the event causing inconvenience to the user 102*a* immersed in the ongoing virtual session 106. Due to the notification buzzing sound, the user 102*a* may then desire to stop and/or pause the ongoing virtual session 106 and stop (and/or address) the notification buzzing sound causing the inconvenience to the user 102*a*. In an embodiment, the detection module 310 may be in communication with the determining module 312.

In an embodiment, the determining module 312 may be configured to determine a correlation between the occurred event in the real-world environment 100 and the first parameter associated with the current activity performed by the user 102*a* in the virtual session 106. The correlation may be indicative of an effect of the occurred event on the first parameter. Alternatively or additionally, the determining module 312 may be configured to predict the effect triggered in response to the occurred event, on the current activity performed by the user 102*a* in the virtual session 106. For example, the effect may be indicative of an impact level of the inconvenience caused by the occurred event. As the event may occur by the electronic device 108 as well, the determining module 312 may be configured to correlate the effect, the device parameter and the first parameters associated with the current activity. For example, the correlation determined by the determining module 312 may provide the system 200 with a threshold of the inconvenience impact level caused by the real-world event and/or the real-world event in the virtual session 106. In an embodiment, the determining module 312 may be configured to determine a second parameter to be associated with the current activity, based on the correlation.

Similar to the first parameter, the second parameter may be representative of sets of altered conditions that the user 102*a* may perceive through the avatar 102*b* to achieve the user intent in the virtual session 106, upon predicting the effect and/or the inconvenience due to the event in the real-world. In an embodiment, the second parameter associated with the current activity may include, but not be limited to, a varied speed of the avatar 102*b*, altered location cues, an exploratory area, a change in current volume of the avatar 102*b* and/or the virtual session 106, and the like. For example, the user 102*a*, while performing the current activity (e.g., shopping), may have the user intent to buy smartphone from the virtual electronics shop present in the virtual session 106. In such an example, when the event occurs in the real-world causing an inconvenience to the user 102*a*, the second parameter (e.g., the exploratory area) may be modified and/or reduced so that the user 102*a* may complete the user intent of shopping and, consequently, may attend to (e.g., address) the event occurring in the real-world swiftly (e.g., attend to the cab arriving in the real-world).

That is, the second parameter determined by the determining module 312 may be different from the first parameter and may transform the virtual session 106 for the user 102*a*.

The second parameter may be determined to reduce inconvenience caused by the real-world event which may further affect user's goals and/or tasks in the metaverse session. In an embodiment, the determining module 312 may be in communication with the transforming module 314.

In an embodiment, the transforming module 314 may be configured to transform the virtual session 106 by modifying the first parameter associated with the current activity based on the determined second parameter. As a result, the second parameter may be used to form a set of conditions configured for transforming the virtual session 106 so that the user 102a may continue to perform the current activity without the effect the event occurred in the real-world, on the virtual session 106.

Figure 4A:
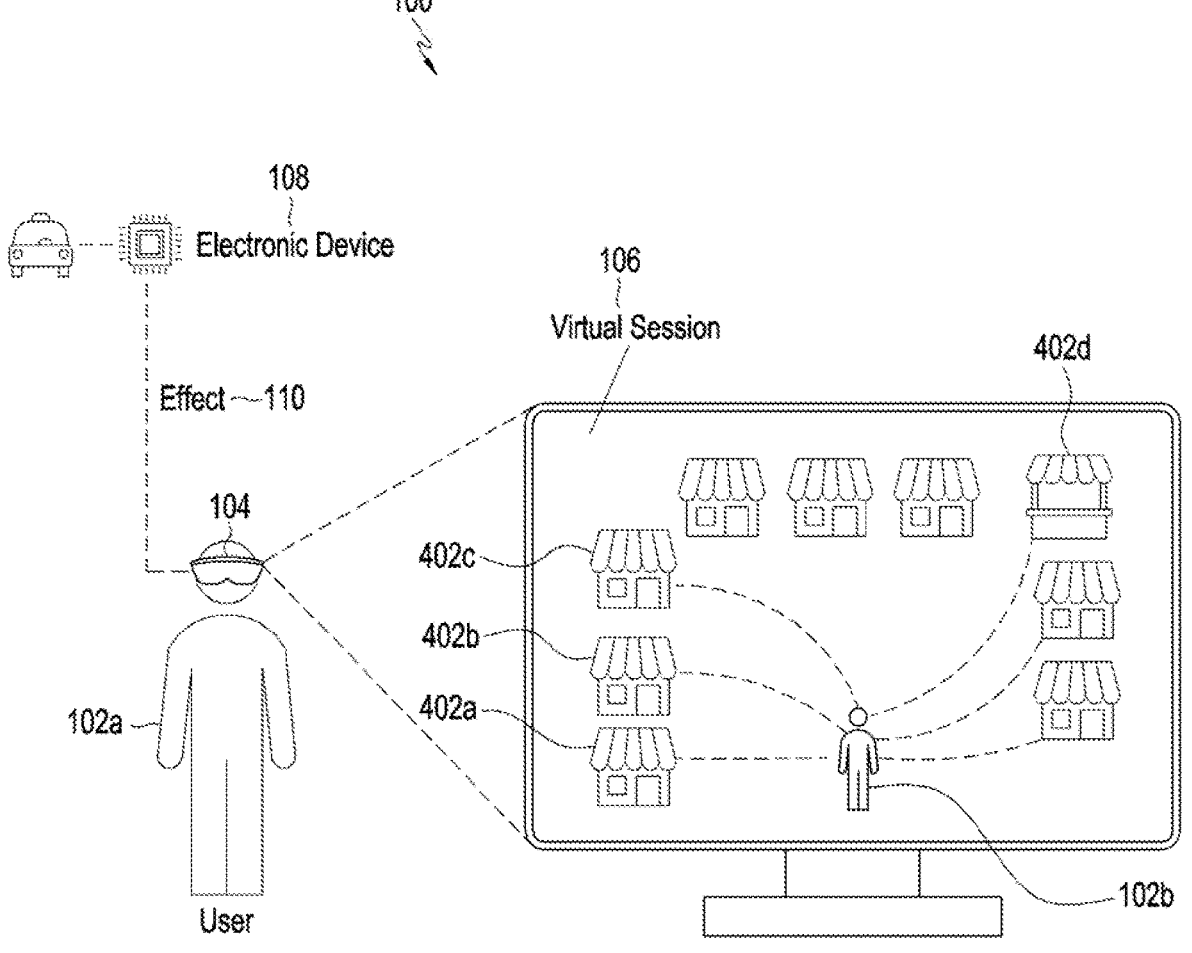
FIGS. 4A and 4B illustrate an exemplary use case depicting transforming in the virtual session based on the event in a real-world, according to an embodiment of the present disclosure.
Figure 4B:
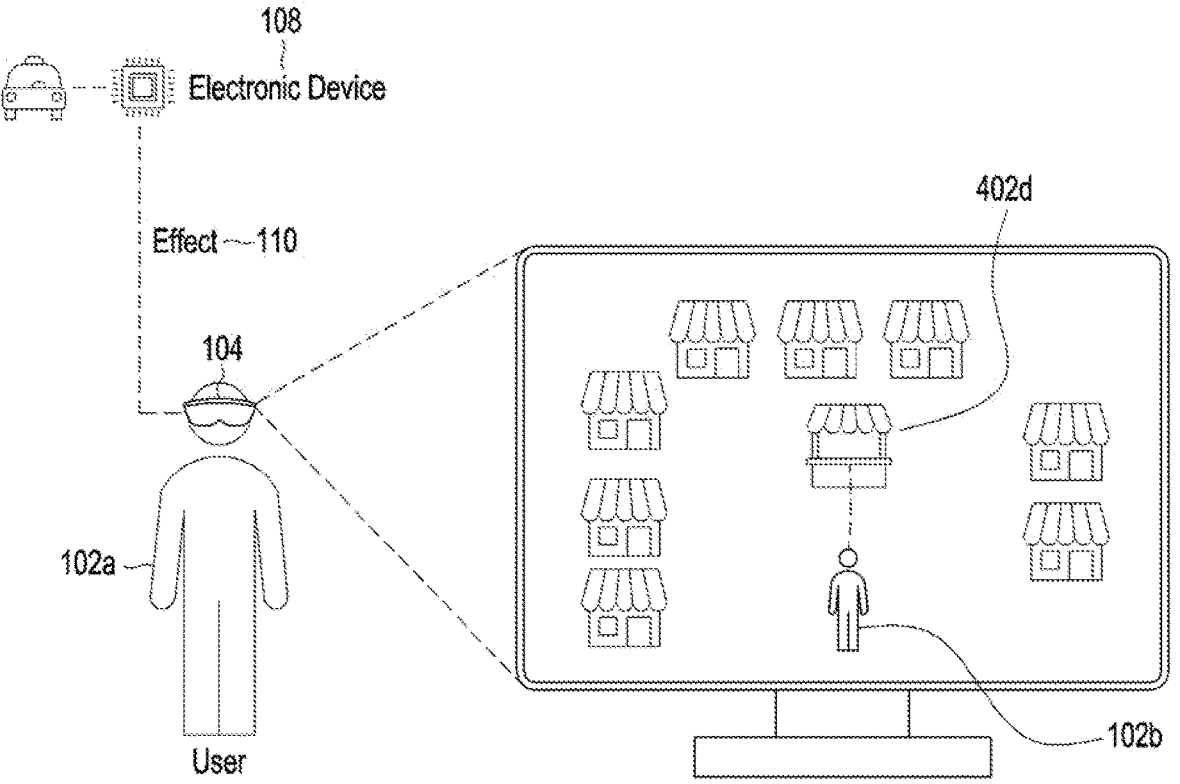

FIGS. 4A and 4B illustrate an exemplary use case depicting transforming the virtual session 106 based on the event in the real-world environment 100, according to an embodiment of the present disclosure.

Referring to FIG. 4A, the user 102a may be immersed into the virtual session 106. For example, the virtual session 106 may represent a shopping mall. In such an example, as the user 102a, through the avatar 102b, may performing the current activity of shopping at the shopping mall of the virtual session 106, the electronic device 108 may be a smartphone that may determine that the user 102a has prebooked a cab/taxi that may be scheduled to arrive in 15 minutes. That is, the system 200, in communication with the electronic device 108, may detect the incoming cab/taxi as the event occurred in the real-world, which may cause inconvenience to the current activity (e.g., shopping of the user 102a in the virtual session 106).

TABLE 1(a)

| Parameters Associated with Current Activity | |
| --- | --- |
| Parameters Associated with Current Activity | Value |
| Avatar Speed | Normal |
| Exploratory area | Wide |
| Navigation | Off |

For example, referring to Table 1(a), parameters associated with the current activity may be provided. It may be apparent that only limited parameters are provided, for example purpose. The controller 206 may determine the first parameter associated with shopping to include parameters, such as, but not limited to, the avatar 102b may be moving normally, and the exploratory area may include a wide area that may include the shops 402a, 402b, 402c, and 402d. Alternatively or additionally, the controller 206 may detect that the user intent may be to reach the shop 402d to finish the goal and/or task associated with the shopping. Furthermore, the controller 206 in communication with the electronic device 108, may detect the cab/taxi arriving in 15 minutes as an event which may cause inconvenience to the user 102a. For example, the inconvenience may be related to the inability of the user 102a to finish shopping in virtual session 106. Accordingly, the controller 206 may compute the effect level of such an event to correlate the event and the first parameter.

Referring to FIG. 4B illustrates, the controller 206 may predict the effect triggered in response to the real-world event (e.g., the cab/taxi arriving in 15 minutes) as equivalent to a high priority and/or high threshold event. Accordingly, the controller 206 may determine the second parameter to be associated with the current activity (e.g., shopping) such that the user 102a may finish the user intent of buying the smartphone before arrival of the cab/taxi.

TABLE 1(b)

| Modified Parameters Associated with Current Activity | |
| --- | --- |
| Parameters Associated with Current Activity | Value |
| Avatar Speed | Fast |
| Exploratory area | Small |
| Navigation | On |

For example, referring to Table 1(b), the controller 206 may modify the first parameters. As shown in Table 1(b), the controller 206 may increase speed of the avatar 102b, and/or may modify the exploratory area to a small area such that the shop 402d may be brought nearer to the avatar 102b. That is, the modifications of the first parameters may assist the user 102a to perform the shopping task prior to the arrival of the cab/taxi and, thus, may reduce the impact level of the inconvenience.

Figure 5A:
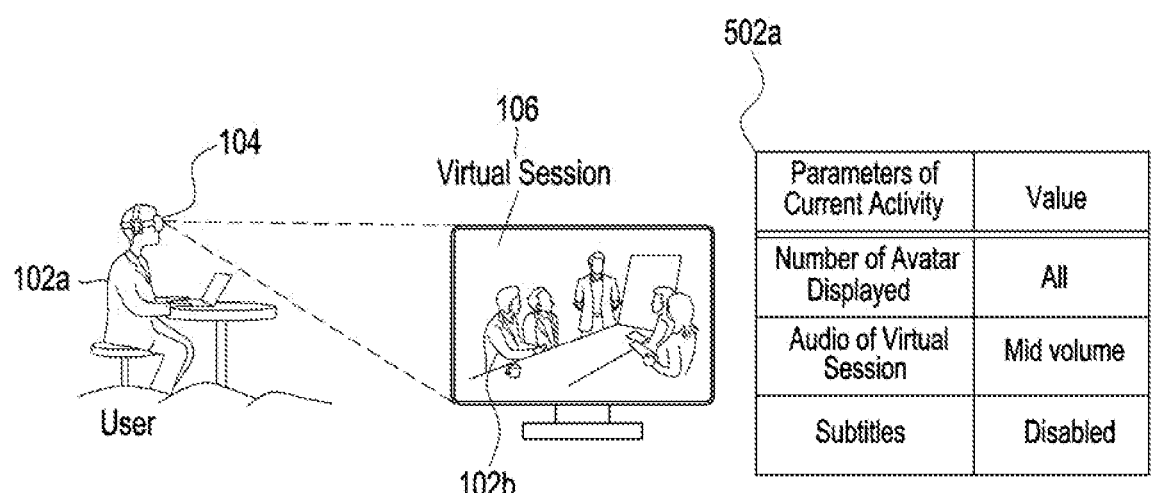
FIGS. 5A and 5B illustrate another exemplary use case depicting transforming the virtual session based on the event in the real-world, according to an embodiment of the present disclosure.
Figure 5B:
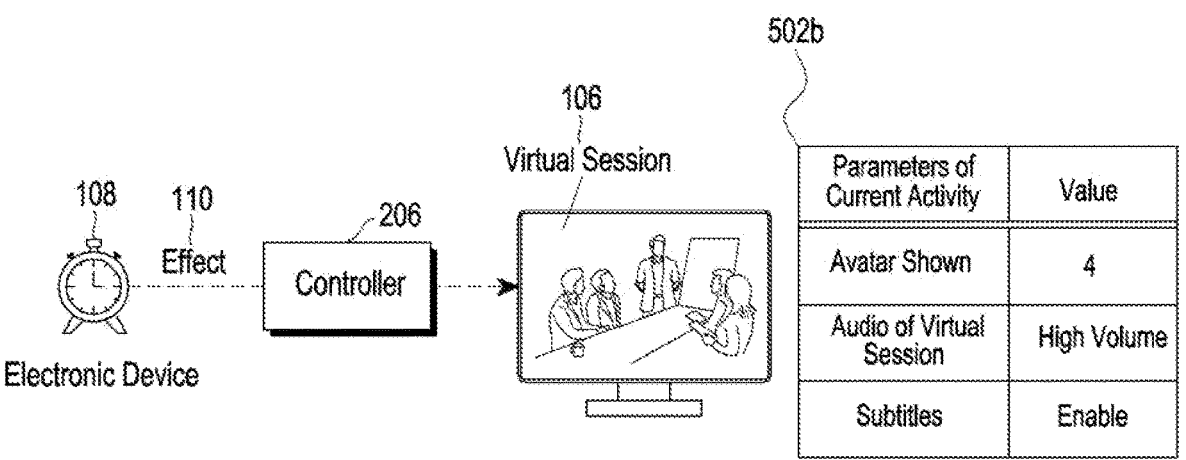

FIGS. 5A and 5B illustrate another exemplary use case depicting transforming the virtual session 106 based on the event in the real-world environment 100, according to an embodiment of the present disclosure.

Referring to FIG. 5A, the user 102a may be immersed into the virtual session 106. For example, the virtual session 106 may represent a virtual meeting room. Continuing to refer to FIG. 5A, Table 502a may be provided with first parameters of the current activity and values corresponding to the first parameters. For example, Table 502a may provide the determined first parameters associated with the current activity of a virtual meeting, such as, but not limited to, "number of avatar displayed", "audio of virtual session", and "subtitles". The corresponding values may indicate characteristics of the first parameters.

Referring to FIG. 5B, as the user 102a, through the avatar 102b, may be performing the current activity of meeting different other avatars in the virtual session 106, the electronic device 108 may include an electronic buzzer/alarm that may start buzzing alarm and/or begin making noise.

The controller 206, in communication with the electronic device 108, may detect the buzzing alarm in the electronic buzzer as the event occurred in the real-world which may cause inconvenience to the current activity (e.g., meeting of the user 102a in the virtual session 106). Alternatively or additionally, the controller 206 may detect that the user 102a intent may be to listen to narration of other avatars present in the virtual session 106. Furthermore, the system 200, in communication with the electronic device 108, may detect the buzzing alarm as an inconvenience to the user 102a immersed in the virtual session 106. The inconvenience may be an inability of the user 102a to listen to the narration of other avatars in the virtual session 106 because of noise produced by the buzzing alarm. Accordingly, the controller 206 may compute the effect level of such an event to correlate the event and the first parameters.

In an embodiment, the controller 206 may predict the effect triggered in response to the real-world event (e.g., the buzzing alarm) as equivalent to a high priority and/or high threshold event. Accordingly, the controller 206 may determine the second parameter to be associated with the current activity (e.g., inability of the user 102a to listen narration of other avatars).

For example, referring to Table 502b, the controller 206 may be configured to modify the values of the first parameters to transform the virtual session 106, such that the user 102*a* may continue to perform the current activity in virtual session 106 without being affected by the real-world event. For example, the "number of avatars displayed" may be reduced (e.g., from "all" to four (4)), "audio of virtual session" may be increased (e.g., from mid volume to high volume, and/or "subtitles" may be enabled. Accordingly, the modifications of the first parameters may assist the user 102*a* to perform the virtual meeting and the impact level of the inconvenience may be reduced.

Figure 6A:
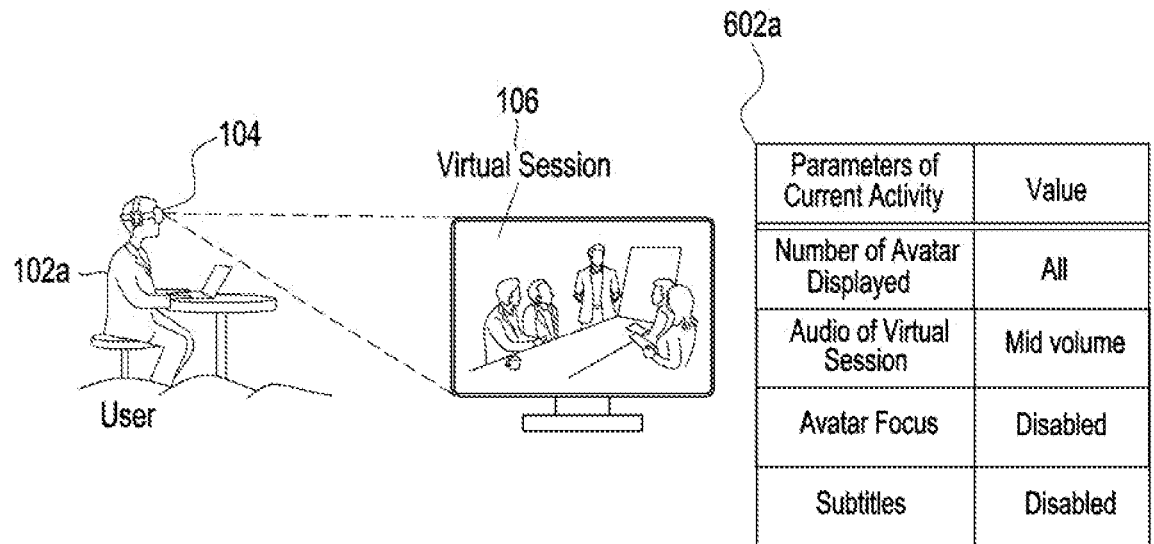
FIGS. 6A and 6B illustrate another exemplary use case depicting transforming the virtual session based on the event in the real-world, according to an embodiment of the present disclosure.
Figure 6B:
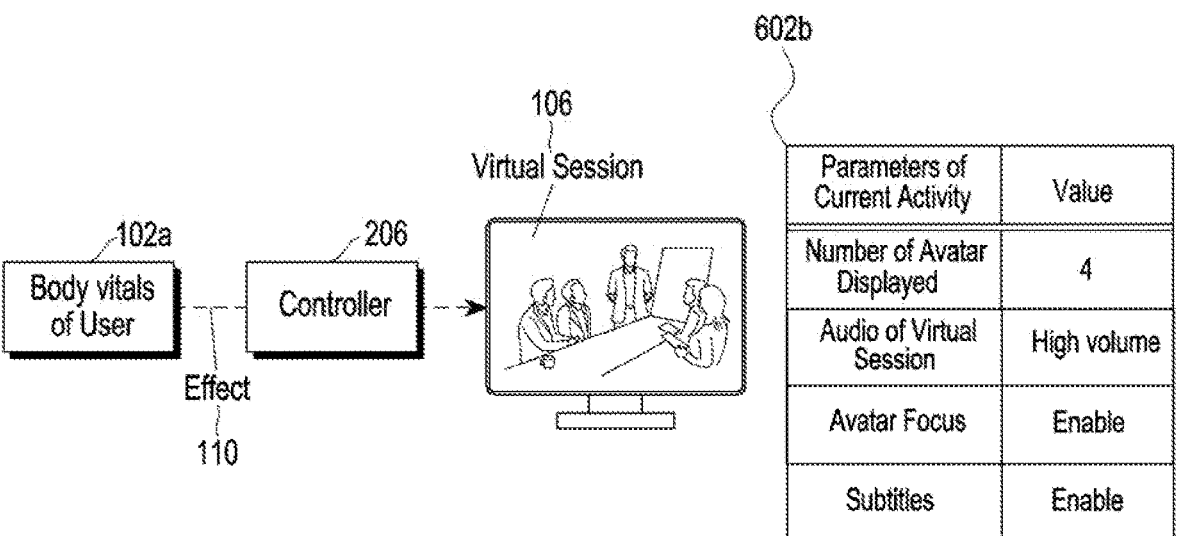

FIGS. 6A and 6B illustrate another exemplary use case depicting transforming the virtual session 106 based on the event in the real-world environment 100, according to an embodiment of the present disclosure.

Referring to FIG. 6A, the user 102*a* may be immersed in the virtual session 106. For example, the virtual session 106 may represent a virtual meeting room wherein the user 102*a* engages in the current activity of conversation with several other avatars. Continuing to refer to FIG. 6A, Table 602*a* may be provided with first parameters of the current activity and with values corresponding to the first parameters. For example, Table 602*a* may provide the determined first parameters associated with the current activity of virtual meeting, such as, but not limited to, "number of avatar displayed", "audio of virtual session", "avatar focus", and "subtitles". The corresponding values may indicate characteristics of the first parameters.

Referring to FIG. 6B, as the user 102*a*, through the avatar 102*b*, may be performing the current activity of meeting different other avatars in the virtual session 106, the user 102*a* may experience inconvenience. For example, the inconvenience may be due to the surrounding conditions of the real-world environment 100. The inconvenience may include, but not limited to, increased heart rate, palpations, sweating. In an embodiment, the user 102*a* may be wearing a smart watch which may detect the user's 102*a* inconvenience. Accordingly, the controller 206 may determine the correlation between the inconvenience felt by the user 102*a* and the current activity.

As shown in Table 602*b*, the controller 206 may be configured to modify values of the first parameters to transform the virtual session 106, such that the user 102*a* may continue to perform the current activity in virtual session 106 without being affected by the real-world event. For example, the "number of avatars displayed" may be reduced (e.g., from "all" to four (4)), the "audio of virtual session" may be increased (e.g., from a mid volume to a high volume), the "avatar focus" may be enabled, and/or the "subtitles" may be enabled. Consequently, the impact level of the inconvenience caused to the user 102*a* may be reduced.

Figure 7A:
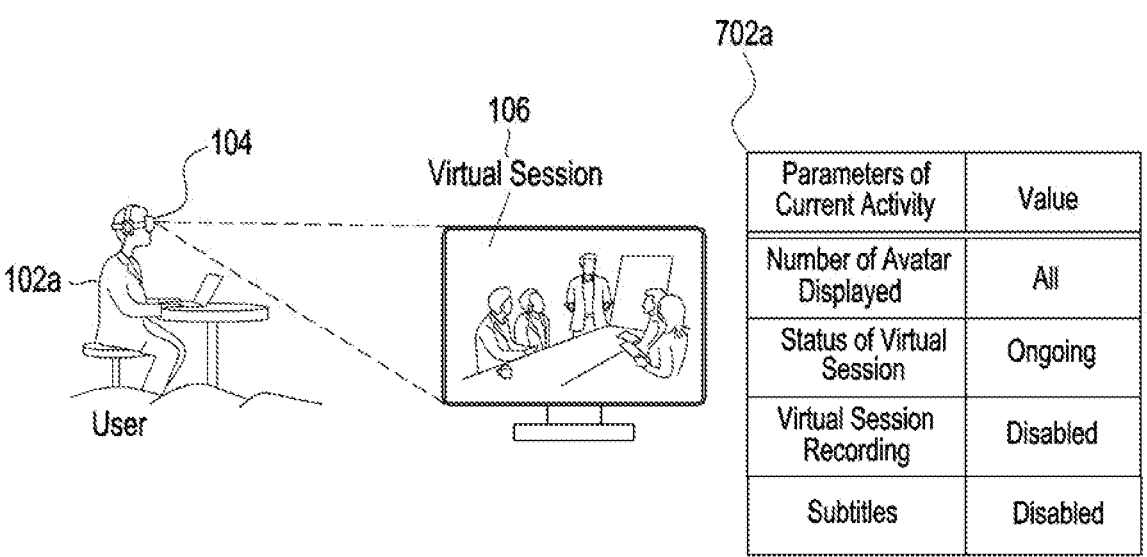
FIGS. 7A and 7B illustrate another exemplary use case depicting transforming the virtual session based on the event in the real-world, according to an embodiment of the present disclosure.
Figure 7B:
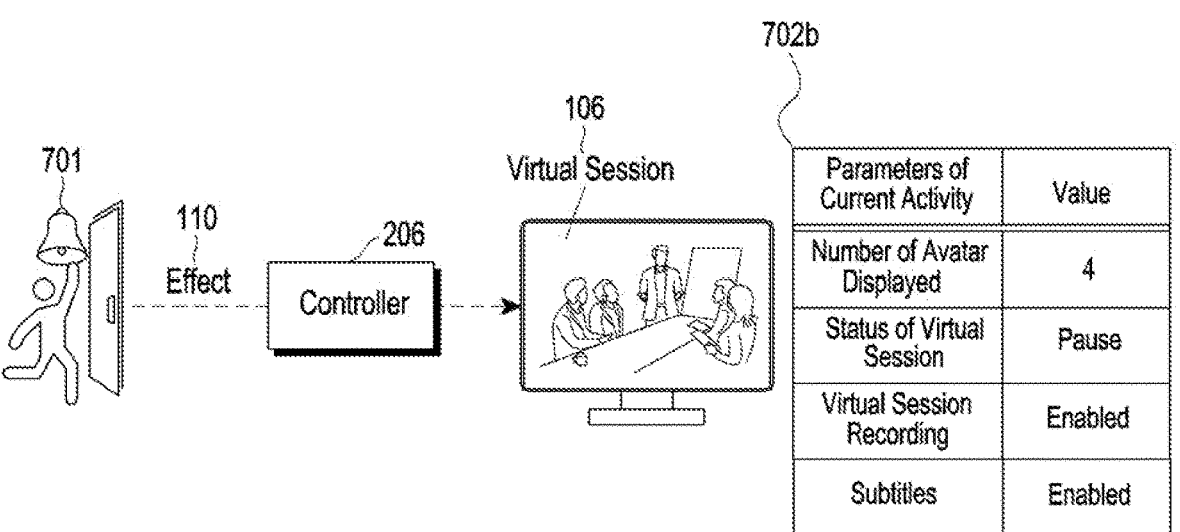

FIGS. 7A and 7B illustrate another exemplary use case depicting transforming the virtual session 106 based on the event in the real-world environment 100, according to an embodiment of the present disclosure.

Referring to FIG. 7A, the user 102*a* may be immersed in the virtual session 106. For example, the virtual session 106 may represent a virtual meeting room wherein the user 102*a* may engage in the current activity of viewing demonstrations presented by several other avatars in the same virtual session 106. Continuing to refer to FIG. 7A, Table 702*a* may be provided with first parameters of the current activity and with values corresponding to the first parameters. For example, Table 702*a* may provide the determined first parameters associated with the current activity of virtual meeting, such as, but not limited to, "number of avatar displayed", "status of virtual session", "virtual session recording", and "subtitles". The corresponding values may indicate characteristics of the first parameters.

Referring to FIG. 7B, a doorbell 701 of the user's home may ring. Consequently, the controller 206 may determine the event of the ringing doorbell 701 and its effect as causing an inconvenience in the virtual session 106. The inconvenience may be due to noise, for example. In an embodiment, the controller 206 may determine the occurrence of the ringing doorbell 701 as a high-priority event. Alternatively or additionally, the controller 206 may determine the correlation between the inconvenience experienced by the user 102*a* and the current activity.

As shown in Table 702*b*, the controller 206 may be configured to modify values of the first parameters to transform the virtual session 106, such that the user 102*a* may continue to perform the current activity in the virtual session 106 without being affected by the real-world event. For example, the "number of avatars displayed" may be reduced (e.g., from "all" to four (4)), the "status of virtual session" may be paused (e.g., changed from "ongoing" to "pause"), the "virtual session recording" may be enabled, and/or the "subtitles" may be enabled. Consequently, the impact level of the inconvenience caused to the user 102*a* may be reduced.

Figure 8A:
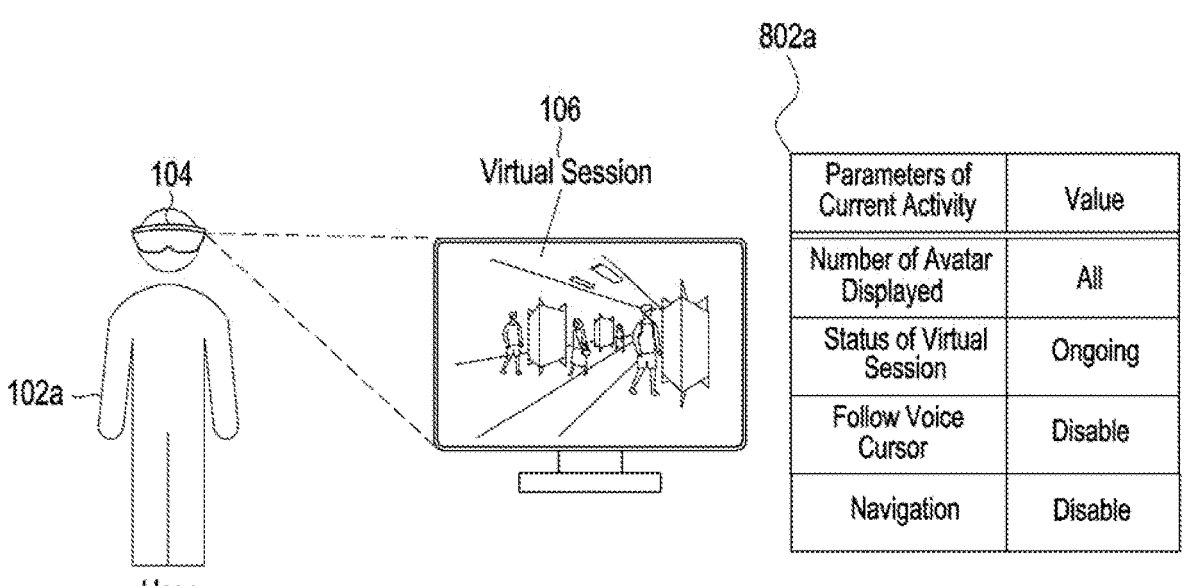
FIGS. 8A and 8B illustrate another exemplary use case depicting transforming the virtual session based on the event in the real-world, according to an embodiment of the present disclosure.
Figure 8B:
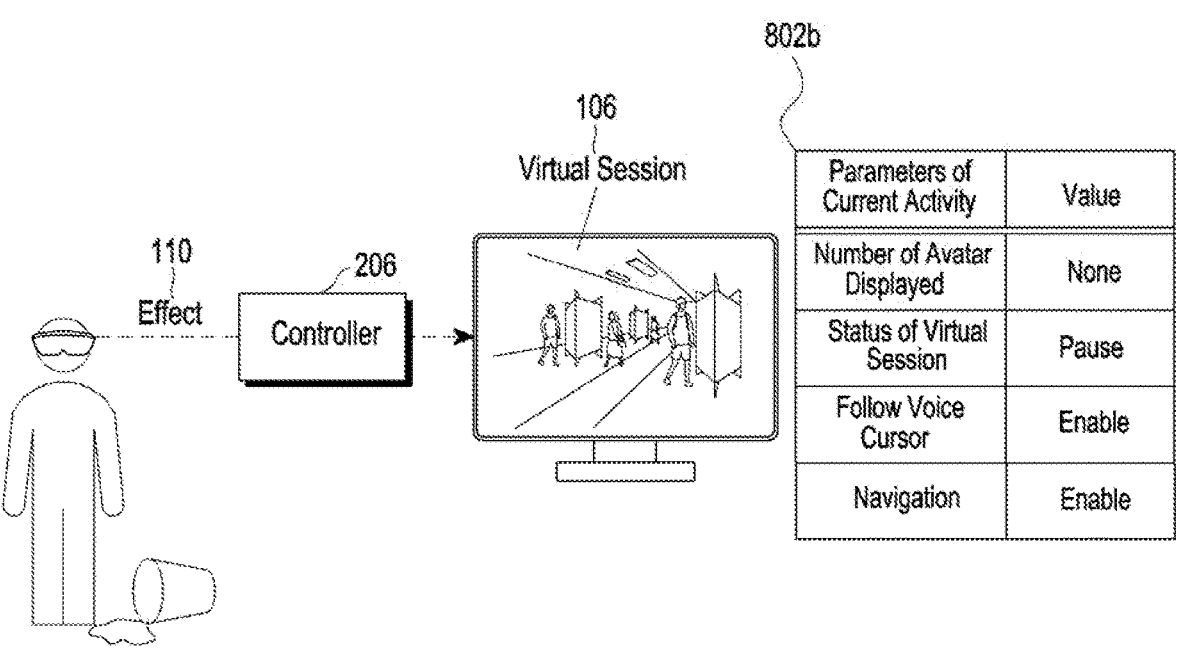

FIGS. 8A and 8B illustrate another exemplary use case depicting transforming the virtual session 106 based on the event in the real-world environment 100, according to an embodiment of the present disclosure.

Referring to FIG. 8A, the user 102*a* may be immersed in the virtual session 106. For example, the virtual session 106 may represent an exhibition in which the user 102*a* may be engaging in the current activity of visiting stalls/kiosks for inspecting displayed items. Continuing to refer to FIG. 8A, Table 802*a* may be provided with first parameters of the current activity and with values corresponding to the first parameters. For example, Table 802*a* may provide the determined first parameters associated with the current activity of virtual meeting, such as, but not limited to, "number of avatar displayed", "status of virtual session", "follow voice cursor", and/or "navigation". The corresponding values may indicate characteristics of the first parameters.

Referring to FIG. 8B, as the user 102*a*, through the avatar 102*b*, may be performing the current activity of visiting stalls/kiosks, the user 102*a* may experience an inconvenience. For example, the inconvenience may be due to water being spilled on the floor near the user 102*a* such that the user 102*a* may experience inconvenience while walking. In an embodiment, the inconvenience may impact the user's ability to focus, and/or provide attention while inspecting the displayed items in the virtual session 106. Accordingly, the controller 206 may detect the water spillage in the real-world environment 100 and related impact of the inconvenience. Alternatively or additionally, the controller 206 may determine the correlation between the inconvenience felt by the user 102*a* and the current activity.

As shown in Table 802*b*, the controller 206 may be configured to modify values of the first parameters to transform the virtual session 106, such that the user 102*a* may continue to perform the current activity in virtual session 106 without being affected by the real-world event. For example, the "number of avatar displayed" may be reduced (e.g., from "all" to "none"), the "status of virtual session" may be paused (e.g., changed from "ongoing" to "pause"), the "follow voice cursor" may be enabled, and/or "navigation" may be enabled. Consequently, the impact level of the inconvenience caused to the user 102a may be reduced.

Figure 9A:
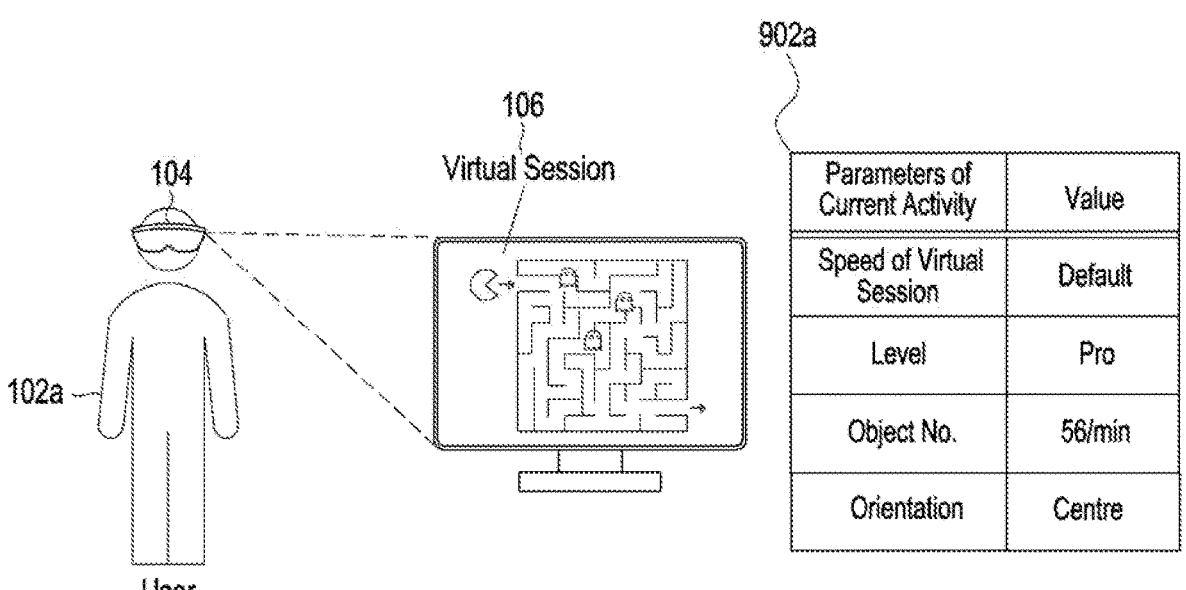
FIGS. 9A and 9B illustrate another exemplary use case depicting transforming the virtual session based on the event in the real-world, according to an embodiment of the present disclosure.
Figure 9B:
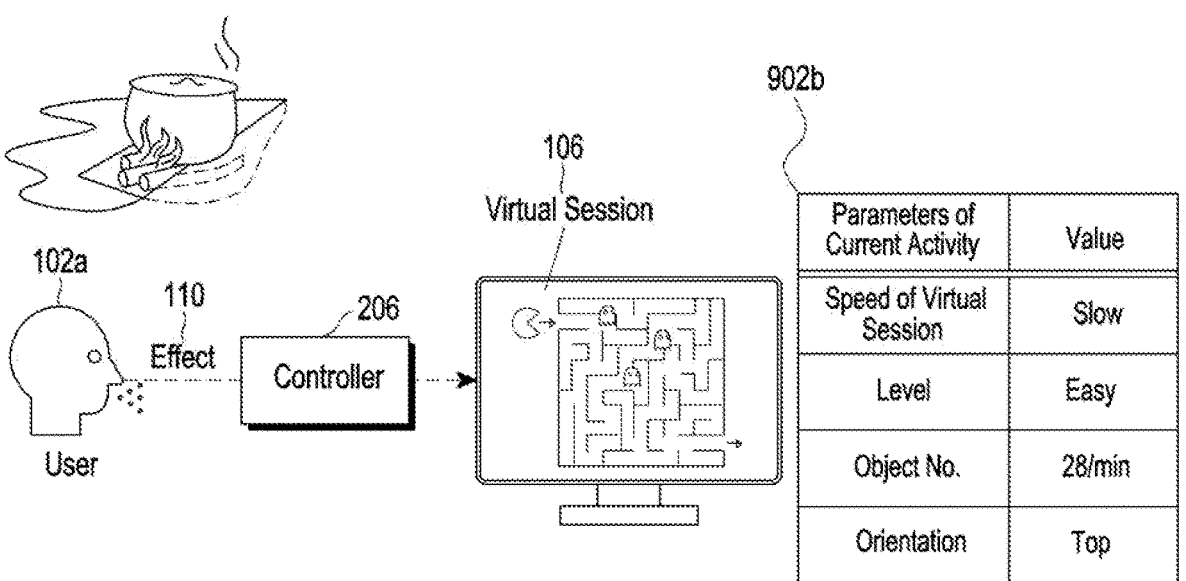

FIGS. 9A and 9B illustrate another exemplary use case depicting transforming the virtual session 106 based on the event in the real-world environment 100, according to an embodiment of the present disclosure.

Referring to FIG. 9A, the user 102a may be immersed in the virtual session 106. For example, the virtual session 106 may include a video game in which the user 102a may be immersed in playing and/or experiencing the video game. Continuing to refer to FIG. 9A, Table 902a may be provided with first parameters of the current activity and with values corresponding to the first parameters. For example, Table 902a may provide the determined first parameters associated with the current activity of virtual meeting, such as, but not limited to, "speed of virtual session", "level", "object number", and/or "orientation". The corresponding values may indicate characteristics of the first parameters.

Referring to FIG. 9B, in the real-world environment 100, another user may be cooking in a surrounding area of the user 102a that may be immersed in playing the video game via the virtual session 106. In an embodiment, the user 102a may suffer from coughing, sneezing, and/or sudden behavioral, physiological changes because of fumes emitted due to cooking. Thus, the user 102a may experience inconvenience while playing the video game. That is, the behavioral, physiological changes causing the inconvenience may impact the user's ability to play the video game in the virtual session 106. Accordingly, the controller 206 may detect the behavioral, physiological changes in the real-world environment 100 and related impact of the inconvenience. Alternatively or additionally, the controller 206 may determine the correlation between the inconvenience felt by the user 102a and the current activity. In an embodiment, the controller 206 may transform the virtual session 106 by modifying some parameters of the video game.

As shown in Table 902b, the controller 206 may be configured to modify values of the first parameters to transform the virtual session 106, such that the user 102a may continue to perform the current activity in virtual session 106 without being affected by the real-world event. For example, the "speed of virtual session" may be reduced (e.g., from "default" to "slow"), the "level" may be reduced (e.g., from "pro" to "easy"), the "object number" may be reduced (e.g., from 56/minute to 28/minute), and/or the "orientation" may be changed. Consequently, the impact level of the inconvenience caused to the user 102a may be reduced.

FIG. 10 illustrates a flowchart depicting a method 1000 for transforming the virtual session 106 based on the event in the real-world environment 100, according to an embodiment of the present disclosure. The method 1000 may be a computer-implemented method executed, for example, by the controller 206. For the sake of brevity, constructional and operational features of the system 200 described above with reference to FIGS. 1 to 3 may be omitted from the description of FIG. 10.

At block 1002, the method 1000 may include detecting the current activity performed by the user 102a in the virtual session 106 and the first parameter associated with the current activity. In an embodiment, the method 1000 may include determining the current activity performed by the user 102a in the virtual session 106 based on one or more of, but not limited to, an audio signal, a position, a time, an avatar, and an event information associated with the virtual session 106.

Alternatively or additionally, the method 1000 may include deriving the user intent to perform the current activity in the virtual session 102. In an optional or additional embodiment, the method 1000 may include determining the first parameter affecting the user intent in the virtual session 106.

At block 1004, the method 1000 may include detecting an occurrence of the event in the real-world environment 100. For example, the occurred event may be indicative of an event in the real-world which may create an effect causing inconvenience to the immersive experience of the user 102a in the virtual session 106.

In an embodiment, the method 1000 may include detecting the electronic device 108 in the real-world environment 100. In an optional or additional embodiment, the method 1000 may include detecting the device parameters associated with the detected electronic 108 device. For example, the method 1000 may include detecting the event and/or altering the device parameters upon detecting the occurrence of the effect in the real-world. That is, the device parameters may be affecting the current activity performed by the user 102a in the virtual session 106.

At block 1006, the method 1000 may include determining a correlation between the event in the real-world environment 100 and the first parameter associated with the current activity performed by the user 102a in the virtual session 106. In an embodiment, the method 1000 may include predicting the effect triggered in response to the event, on the current activity performed by the user 102a in the virtual session 106. For example, the effect may be indicative of an inconvenience that may affect the user 102a immersed in the virtual session 106.

At block 1008, the method 1000 may include determining the second parameter to be associated with the current activity based on the correlation. For example, the method 1000 may include correlating the effect that may have been triggered in response to the event in the real-world, the device parameter, and the first parameter associated with the current activity in order to determine the second parameter. In an embodiment, the second parameter may be associated with the current activity.

At block 1010, the method 1000 may include transforming the virtual session 106 by modifying the first parameter associated with the current activity based on the determined second parameter. For example, the virtual session 106 may be transformed based on the second parameters. That is, modifying the virtual session 106 based on the second parameters may be performed so that the user 102a may continue to perform the current activity without effect of the event occurred in the real-world, on the virtual session 106.

Advantageously, as described above, aspects of the present disclosure may provide for detection of events in the real-world and/or other external events that may cause inconvenience to a user that may be immersed in a virtual session. In addition, aspects of the present disclosure may provide for determining goals and/or tasks of the immersed user in the virtual session and may accordingly change parameters of the virtual session. Such changes in the virtual session parameters may aid the immersed user to complete the goals and/or tasks in the virtual session with a reduced inconvenience. Alternatively or additionally, aspects of the present disclosure may provide an enhance user experience to the immersed user in a metaverse, as the user may continue and/or complete the goals and/or tasks in a metaverse session upon occurrence of the event in the real-world environment. Furthermore, aspects of the present disclosure provide for changing of metaverse parameters that may provide the immersed user with a customized experience based on the current activity of the immersed user and the effects of the external event that may be inconveniencing the immersed user.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

What is claimed is:

1. A method for managing a virtual session, the method comprising:

identifying a current activity performed by a user in the virtual session;

determining at least one first parameter of the virtual session associated with the current activity;

detecting an occurrence of at least one event in a real-world environment;

determining a correlation between the at least one event and the at least one first parameter;

determining at least one second parameter to be associated with the current activity, based on the correlation between the at least one event and the at least one first parameter; and transforming the virtual session by modifying the at least one first parameter based on the at least one second parameter such that an effect of the at least one event in the real-world environment to the current activity in the virtual session is reduced, wherein the transforming of the virtual session comprises, based on the at least one event including noise, increasing audio volume of the virtual session or enabling subtitles of the virtual session.

2. The method of claim 1, wherein the selecting the at least one first parameter comprises:

identifying a user intent to perform the current activity in the virtual session; and determining the at least one first parameter affecting the user intent in the virtual session.

3. The method of claim 1, further comprising:

detecting at least one electronic device in the real-world environment; and detecting at least one device parameter associated with the detected at least one electronic device affecting the current activity.

4. The method of claim 3, further comprising:

predicting at least one effect on the current activity, in response to the at least one event; and correlating the at least one effect, the at least one device parameter, and the at least one first parameter, wherein the at least one second parameter to be associated with the current activity is determined based on the correlation of the at least one effect, the at least one device parameter, and the at least one first parameter.

5. The method of claim 1, wherein the correlation indicates the effect of the at least one event on the at least one first parameter.

6. The method of claim 5, wherein the effect indicates an impact level of an inconvenience caused to the user by the at least one event.

7. The method of claim 1, wherein the transforming the virtual session comprises:

modifying the virtual session based on the at least one second parameter such that the user continues to perform the current activity in the virtual session.

8. The method of claim 1, further comprising:

determining the current activity performed by the user in the virtual session based on at least one audio signal, a position, a time, and an event information associated with the virtual session.

9. The method of claim 1, further comprising:

tracking an occurrence of the at least one event in the real-world environment, wherein the at least one first parameter is determined based on a determination that the at least one event occurred in the real-world environment.

10. An apparatus for managing a virtual session, the apparatus comprising:

memory storing instructions; and at least one processor communicatively coupled to the memory, wherein the instructions, when executed by the at least one processor, cause the apparatus to:

identify a current activity performed by a user in the virtual session;

determine at least one first parameter of the virtual session associated with the current activity;

detect an occurrence of at least one event in a real-world environment;

determine a correlation between the at least one event and the at least one first parameter;

determine at least one second parameter to be associated with the current activity, based on the correlation between the at least one event and the at least one first parameter; and transform the virtual session by modifying the at least one first parameter based on the at least one second parameter such that an effect of the at least one event in the real-world environment to the current activity in the virtual session is reduced, wherein to transform the virtual session comprises, based on the at least one event including noise, increasing audio volume of the virtual session or enabling subtitles of the virtual session.

11. The apparatus of claim 10, wherein the instructions, when executed by the at least one processor, further cause the apparatus to:

identify a user intent to perform the current activity in the virtual session; and determine the at least one first parameter affecting the user intent in the virtual session.

12. The apparatus of claim 10, wherein the instructions, when executed by the at least one processor, further cause the apparatus to:

detect at least one electronic device in the real-world environment; and detect at least one device parameter associated with the detected at least one electronic device affecting the current activity.

13. The apparatus of claim 12, wherein the instructions, when executed by the at least one processor, further cause the apparatus to:

predict at least one effect on the current activity, in response to the at least one event; and correlate the at least one effect, the at least one device parameter and the at least one first parameter, wherein the at least one second parameter to be associated with the current activity, is determined based on the correlation of the at least one effect, the at least one device parameter, and the at least one first parameter.

14. The apparatus of claim 10, wherein the correlation indicates the effect of the at least one event on the at least one first parameter.

15. The apparatus of claim 14, wherein the effect indicates an impact level of an inconvenience caused to the user by the at least one event.

16. The apparatus of claim 10, wherein the instructions, when executed by the at least one processor, further cause the apparatus to:

modify the virtual session based on the at least one second parameter such that the user continues to perform the current activity in the virtual session.

17. The apparatus of claim 10, wherein the instructions, when executed by the at least one processor, further cause the apparatus to:

detect the current activity performed by the user in the virtual session based on at least one audio signal, a position, a time, and an event information associated with the virtual session.

18. The apparatus of claim 10, wherein the instructions, when executed by the at least one processor, further cause the apparatus to track an occurrence of the at least one event in the real-world environment, and wherein the at least one first parameter is determined based on a determination that the at least one event occurred in the real-world environment.

\* \* \* \* \*